Aug. 12, 1958     J. R. MILES     2,846,918
BINOCULAR EYE LENS SYSTEM
Filed Nov. 13, 1953
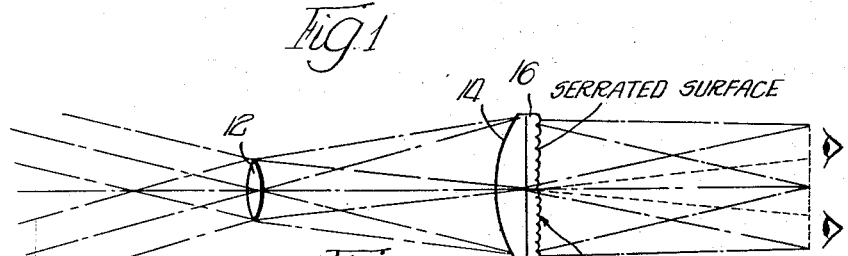
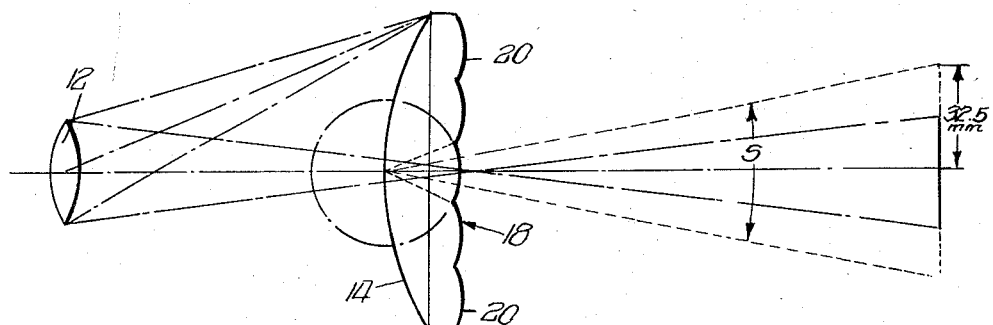
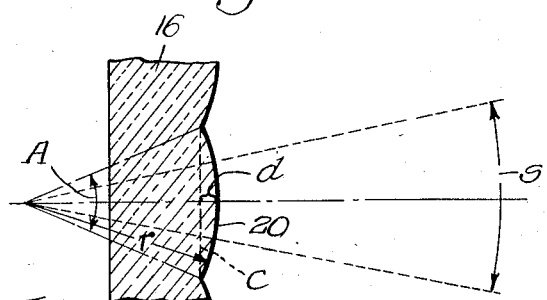
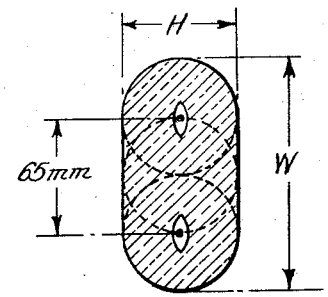
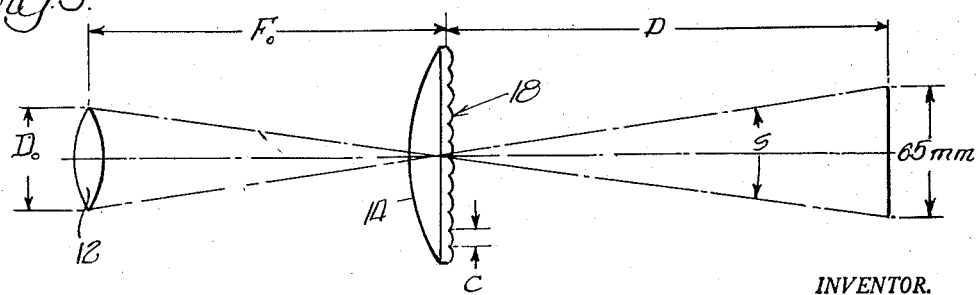
INVENTOR.
John R. Miles,
BY Williamson, Hurley,
Byron + Hume
ATTYS

2,846,918
Patented Aug. 12, 1958

2,846,918
BINOCULAR EYE LENS SYSTEM

John R. Miles, Chicago, Ill., assignor to Chicago Aerial Industries, Inc., Chicago, Ill., a corporation of Illinois Application November 13, 1953, Serial No. 391,837

3 Claims. (Cl. 88—1)

This invention relates to optical systems such as periscopes or the like, and more particularly to such systems incorporating a binocular eye lens or viewing lens.

In the past, in order to obtain binocular vision with comparative freedom from distortion and other objectionable aberrations, it has been necessary to have a lens for each eye somewhere in the optical system. Even in the case of systems having a single eye lens and binocular vision, two erectors have been employed, one for the right eye and one for the left eye, the size of each erector governing the eye freedom. The two erectors have been normally put side by side, their separation being governed by the separation or inter-pupillary distance of the human eyes.

It is an object of the present invention, on the other hand, to eliminate this use of separate lenses for each eye in an optical system providing binocular vision.

It is a further object of this invention to provide an optical system having a novel eye lens or viewing lens, which system provides binocular vision and has relatively high light transmission characteristics, together with simplicity and light weight.

In the drawing:

Figure 1 is a plan view of an optical system illustrating one embodiment of the invention;

Figure 2 is an enlarged, somewhat diagrammatic plan view of the light spreader in the system shown in Figure 1;

Figure 3 is a still further enlarged view of a fragmentary portion of the light spreader shown in Figure 1;

Figure 4 is a somewhat diagrammatic representation of the elongated exit pupil of the optical system shown in Figure 1; and Figure 5 is a somewhat diagrammatic representation of the portion of the optical system shown in Figure 1 including reference letters for the dimensions of various elements.

Referring now to Figure 1, the optical system shown therein may comprise an objective lens 12 disposed in suitable alignment with a field lens 14. The latter lens may have disposed in close association therewith a light spreader 16 having a novel structure. As best shown in Figure 2, one surface of the light spreader, indicated generally by the numeral 18, is serrated, and, more specifically, has a plurality of vertically disposed, substantially contiguous, cylindrical segments 20 formed thereon. This serrated surface 18 causes the light entering the field lens 14 to be spread out in a horizontal direction. This horizontal spreading of the light in turn produces an elongated exit pupil such as that shown in Figure 4. This elongated exit pupil preferably has a height H equal to the projected size of the erector lens 12 and a width W equal to this height, plus approximately 65 mm., which latter distance is the normal inter-pupillary separation of the human eyes.

The vertical cylindrical segments are quite small, having a chord C (best shown in Figure 3) which may be in the order of magnitude of 1 mm. or less. The segments are therefore not normally visible, individually, since the normal viewing distance will be at a point 15 to 30 inches from the eyes of the observer.

The field lens is a collective type lens which may be formed as a single plano-convex lens or of a plurality of lenses. In the preferred form, the serrated surface described can be formed on a sheet and disposed against the outside surface of the outside lens. The image to be viewed is formed in the plane of this serrated surface, but because of the fineness of the serrations, there is no visible change in the image. Actually, the serrated portion can be placed anywhere near the image, which is near or at the eye lens. In the serrated surface the depth $d$ of the cylindrical segments, (measured from the chord thereof) should have a minimum value such that the serrations will produce a sufficient spreading of light and a maximum value such that the degree of "spherical aberration" produced by said serrations is not prohibitive. Actually, since these are cylindrical segments, it might be more accurate to characterize the "spherical aberrations" as "off-axis focal aberrations."

As to the chord of each cylindrical segment, it should preferably be no longer than substantially $\frac{1}{3000}$ of the distance of the observer's eyes from the light spreader. The resolving power of the human eye is limited in this fashion so that if this limitation is observed, the serrations will not be visible. Since the distance for the observer's eyes to the light spreader will normally be no greater than 30 inches, the length of the chord can be approximately $\frac{1}{3}$ of a millimeter. Ordinarily the chord length should be no greater than 1 mm. since if it were, this would call for a distance of at least 9 feet approximately from the observer's eyes to the eye lens. In addition, at such distances, a light spreader would probably be unnecessary because of the relatively large size of the exit pupil as projected, even though the objective lens might be quite small.

To obtain an elongated exit pupil of the type shown in Figure 4 with an optical system such as is illustrated in Figure 1, it will be necessary to use a light spreader having certain physical characteristics. These characteristics may conveniently be defined in terms of their relation to the distance of the eyes of the observer to the light spreader, indicated by the letter D in Figure 5. The chord of each cylindrical segment, indicated by the letter C in Figure 3, for example, should be no greater than $$\frac{D}{3000}$$

and, on the other hand, should not be small enough to be of the same order of magnitude as the wave length of light since this would cause objectionable diffraction. The angular spread produced by each cylindrical segment, indicated in Figure 2 by the letter S, will be equal to 2 arc tan $$\frac{32.5}{D}$$

as can be seen from Figure 5, 32.5 being one-half of the 65 mm. interpupillary separation of the eyes.

When light is refracted the refracted angle is approximately equal to the angle of inclination of the refracting surface (A, in this case), divided by N–1, where N is the index of refraction. Assuming that the material used in the light spreader has an index of refraction of 1.5, then:

$$S = \frac{A}{1.5 - 1} = \frac{A}{0.5}$$

or $$A = 2S$$

In other words, $$A = 4 \arctan \frac{32.5}{D}$$

Likewise the value of the radius of each cylinder, indicated generally in Figure 3 by the letter $r$, can be expressed in the following manner:

$$r = \frac{(C/2)^2}{2d} = \frac{C^2}{8d}$$

where $d$ equals the actual depth of the cylindrical segment subtended by the chord C, as shown in Figure 3.

The focal length of the erector lens may be related to the diameter of the erector lens and the length of the chord subtended by the cylindrical segments. The focal length in millimeters may be equal to not more than approximately 50 times the product of the diameter of the erector lens and the length of the chord. This relationship is shown by first, referring to Figure 5, where $D_0$ is the diameter of the objective lens, $F_0$ is the focal length of the objective lens, C is the length of the chord of the cylindrical segments of the light spreader, and D is the distance from the light spreader to the observer's eyes, by similar triangles:

$$\frac{D_0}{F_0} = \frac{65}{D}$$

In view of the above statement that the length of the chord should be no larger than substantially $\frac{1}{3000}$ of the distance of the observer's eyes from the light spreader, 3250 C (approximately 3000 C) may be substituted for D in this last equation. Then:

$$\frac{D_0}{F_0} = \frac{65}{3250C}$$

or $$\frac{F_0}{D_0} = \frac{3250C}{65} = 50C$$

or $$F_0 = 50CD_0$$

This is the basis for the above statement regarding the focal length of the erector lens.

An alternative formula for A can be developed from two of the above formulas:

(1) $$A = 4 \arctan \frac{32.5}{D}$$

(2) also if $$\frac{D_0}{F_0} = \frac{65}{D}$$

then (3) $$\frac{D_0}{2F_0} = \frac{32.5}{D}$$

and substituting in (1):

(4) $$A = 4 \arctan \frac{D_0}{2F_0}$$

The maximum slope which each cylindrical segment makes with a plane perpendicular to the axis of the erector lens may be between 1.8 times and 2.2 times the product of the slope of the angle subtended by the diameter of said erector lens at a distance equal to its focal length and $(N_D - 1)$, where $N_D$ equals the index of refraction in sodium D light of the material used in the light spreader.

The specific embodiment shown in the drawings has the specifications shown in the following table:

| | | |
|---|---|---|
| Objective diameter | inches | 2.5 |
| Spreader diameter | do | 7 |
| Objective lens focal length | do | 25 |
| Segment chordal length | do | .013 |
| Distance of erector to field lens | do | 25 |
| Distance of eyes to field lens | do | 25 |
| Maximum slope of cylindrical segments | | $\frac{1}{10}$ |
| Radius of cylindrical segments | inches | .0653 |

The maximum slope given as $\frac{1}{10}$ is the tangent of the actual angle which is 5 degrees, 42 minutes. The radius of this cylindrical segment is therefore found by $$\frac{.013'' \times .5}{\sin U}$$

where the tangent of $U$ = the slope (.1) or $$\frac{.013'' \times .5}{.099511} = .0653''$$

I claim:

1. A binocular viewing device having a laterally elongated exit pupil comprising an objective lens unit having a diameter of approximately 2.5 inches and a focal length of approximately 25 inches, a field lens unit having a diameter of approximately 7 inches and a transparent light spreader having a diameter of approximately 7 inches disposed substantially at the image formed by said objective lens unit, one surface of said light spreader having a plurality of vertically disposed contiguous cylindrical segments formed therein, the radius of said cylindrical segments being approximately .065 inch and the maximum slope thereof being approximately $\frac{1}{10}$ where the slope is the tangent of the angle formed by the normal to the surface of the light spreader with the major axis of said light spreader, the chord of each cylindrical segment being approximately .013 inch, the distance of the objective lens to the field lens being approximately 25 inches and said laterally elongated exit pupil being located approximately 25 inches from said field lens.

2. A binocular viewing device having a laterally elongated exit pupil comprising an objective lens unit having a diameter of approximately the interpupillary distance of a person and a focal length of within the range of 25 to 40 inches, a field lens unit having a diameter appreciably larger than said objective lens and a transparent light spreader having a diameter appreciably larger than said objective lens disposed substantially at the image formed by said objective lens unit, one surface of said light spreader having a plurality of vertically disposed contiguous cylindrical segments formed therein, the radius of said cylindrical segment being approximately .065 inch and the maximum slope thereof being approximately $\frac{1}{10}$, where the slope is the tangent of the angle formed by the normal to the surface of the light spreader with the major axis of said light spreader, the chord of each cylindrical segment being approximately .013 inch, the distance of the objective lens to the field lens being approximately 25 to 40 inches, and said laterally elongated exit pupil being located approximately 25 inches from said field lens.

3. A binocular viewing device having a laterally elongated exit pupil comprising an objective lens unit, a field lens unit, said field lens unit being appreciably larger than said objective lens unit and a transparent light spreader having a diameter substantially the same as that of said field lens unit, said transparent light spreader being disposed substantially at the image formed by said objective lens unit, the surface of said light spreader having a plurality of vertically disposed contiguous cylindrical segments, the maximum slope of said cylindrical segments being approximately $\frac{1}{10}$, where the slope is the tangent of the angle formed by the normal to the surface of the light spreader with the major axis of said light spreader, said laterally elongated exit pupil being located from said light spreader a distance approximately equal to 3,000 times the chordal length of said cylindrical segments and the focal length of said objective lens unit being no greater than 50 times the product of the chordal length of each of said cylindrical segments and the diameter of said objective lens unit.

References Cited in the file of this patent

UNITED STATES PATENTS

| | | |
|---|---|---|
| 1,634,760 | Thorner | July 5, 1927 |
| 1,825,122 | Oswald | Sept. 29, 1931 |
| 1,916,320 | Ives | July 4, 1933 |
| 2,005,014 | Tondreau | June 18, 1935 |
| 2,011,263 | Rantsch | Aug. 13, 1935 |
| 2,038,409 | Bone | Apr. 21, 1936 |
| 2,589,014 | McLeod | Mar. 11, 1952 |
| 2,604,002 | Wengel | July 22, 1952 |

FOREIGN PATENTS

| | | |
|---|---|---|
| 87,589 | Switzerland | Dec. 16, 1920 |